United States Patent
Anderson et al.

(10) Patent No.: US 8,433,763 B2
(45) Date of Patent: *Apr. 30, 2013

(54) FAULT TOLERANT DISTRIBUTED MESSAGING ARCHITECTURE FOR COMPUTER-AIDED DISPATCH SYSTEM

(75) Inventors: Scott R. Anderson, Winston Salem, NC (US); Kenneth Matson, Bellevue, WA (US); Steven McDowall, Winston Salem, NC (US)

(73) Assignee: Interact911 Corporation, Winston Salem, NC (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/761,600

(22) Filed: Apr. 16, 2010

(65) Prior Publication Data

US 2011/0145344 A1    Jun. 16, 2011

Related U.S. Application Data

(60) Provisional application No. 61/285,885, filed on Dec. 11, 2009.

(51) Int. Cl.
*G06F 15/16* (2006.01)
(52) U.S. Cl.
USPC ................ 709/206; 709/201; 709/239
(58) Field of Classification Search ............. 709/206, 709/201, 239
See application file for complete search history.

(56) References Cited

U.S. PATENT DOCUMENTS

| | | | |
|---|---|---|---|
| 6,345,281 B1 | 2/2002 | Kardos et al. | 707/201 |
| 6,744,858 B1 | 6/2004 | Ryan et al. | 379/45 |
| 7,756,254 B1 | 7/2010 | Croak et al. | 379/46 |
| 7,860,222 B1 | 12/2010 | Sidler et al. | 379/32.01 |
| 7,962,644 B1 | 6/2011 | Ezerzer et al. | 709/238 |
| 7,996,465 B2 | 8/2011 | Cromp et al. | 709/204 |
| 8,005,937 B2 | 8/2011 | Wesley, Sr. et al. | 709/223 |
| 2004/0102178 A1 | 5/2004 | Williams | 455/404.1 |
| 2006/0211404 A1* | 9/2006 | Cromp et al. | 455/405 |
| 2007/0091876 A1 | 4/2007 | Araki et al. | 370/352 |
| 2009/0100165 A1* | 4/2009 | Wesley et al. | 709/223 |
| 2010/0332647 A1* | 12/2010 | Agulnik et al. | 709/224 |
| 2011/0134919 A1* | 6/2011 | Averbuch | 370/392 |

OTHER PUBLICATIONS

U.S. Appl. No. 12/717,650 entitled "Proxy-Based, Distributed Computer-Aided Dispatch System", filed by Scott R. Anderson et al., Mar. 4, 2010.

(Continued)

*Primary Examiner* — Nicholas Taylor
(74) *Attorney, Agent, or Firm* — Baker Botts L.L.P.

(57) ABSTRACT

In one embodiment, a computer-aided dispatch (CAD) system includes a database for storing data originated at a plurality of CAD stations; a manager that manages access to the data stored in the database; and the plurality of CAD stations communicatively connected to the manager and to each other. While the manager is available, each CAD station transmits the critical data and the non-critical data originated at the CAD station to the manager and receives the critical data and the non-critical data originated at one or more other CAD stations from the manager. While the manager is unavailable, each CAD station transmits the critical data originated at the CAD station directly to all other CAD stations and receives the critical data originated at the one or more other CAD stations directly from the one or more other CAD stations.

21 Claims, 4 Drawing Sheets

OTHER PUBLICATIONS

USPTO, Nonfinal Office Action for U.S. Appl. No. 12/717,650, Feb. 28, 2012.
Anderson et al., Response to Nonfinal Office Action for U.S. Appl. No. 12/717,650, May 25, 2012.
USPTO, Final Office Action for U.S. Appl. No. 12/717,650, Aug. 1, 2012.
Anderson et al., Response to Final Office Action for U.S. Appl. No. 12/717,650, Oct. 1, 2012.
USPTO, Advisory Action Before the Filing of an Appeal Brief for U.S. Appl. No. 12/717,650, Oct. 16, 2012.
Request for Continued Examination Transmittal for U.S. Appl. No. 12/717,650, Nov. 1, 2012.

* cited by examiner

FAULT TOLERANT DISTRIBUTED MESSAGING ARCHITECTURE FOR COMPUTER-AIDED DISPATCH SYSTEM

RELATED APPLICATION

This application claims benefit under 35 U.S.C. §119(e) of U.S. Provisional Patent Application No. 61/285,885, entitled FAULT TOLERANT DISTRIBUTED MESSAGING ARCHITECTURE FOR COMPUTER-AIDED DISPATCH SYSTEM, filed 11 Dec. 2009, which is hereby incorporated by reference.

TECHNICAL FIELD

The present disclosure generally relates to a computer-aided dispatch (CAD) system and more specifically relates to a fail-safe strategy for the CAD system, which enables the individual CAD stations within the CAD system to directly exchange critical data with each other while a manager of a database of the CAD system is unavailable, thus avoiding any interruptions to the services provided by the CAD stations.

BACKGROUND

Computer-aided dispatch (CAD), also referred to as computer-assisted dispatch, is a method of dispatching emergency services, such as fire trucks, ambulances, police vehicles, and non-emergency services, such as taxicabs, couriers, field service technicians, assisted by computers. CAD may be used to send messages to the field personnel via mobile data terminals and store and retrieve data, such as radio logs, field interviews, client information, and schedules. For example, a dispatcher may announce the call details to the field units over two-way radios or using text messages. CAD may provide displays and tools so that a dispatcher may handle calls-for-service as efficiently as possible.

CAD may consist of a suite of software packages used to initiate calls-for-service, dispatch field units, and maintain the status of responding resources in the field. CAD systems may consist of several modules that provide services at multiple levels in a dispatch center and in the field, which may include call input, call dispatching, call status maintenance, event notes, field unit status and tracking, and call resolution and disposition. CAD systems may also include interfaces that permit the software to provide services to dispatchers, call-takers, and field personnel with respect to the control and use of traditional equipment, such as analog radios and telephones, as well as logger-recorder functions.

SUMMARY

The present disclosure generally relates to a computer-aided dispatch (CAD) system and more specifically relates to a failover and fail-safe mechanisms for the CAD system, which enables the individual CAD stations within the CAD system to directly exchange critical data with each other while a manager of a database of the CAD system is unavailable, thus avoiding any interruptions to the services provided by the CAD stations.

In particular embodiments, a computer-aided dispatch (CAD) system includes: a database for storing critical data and non-critical data originated at a plurality of CAD stations; a manager that manages access to the critical data and the non-critical data stored in the database; and the plurality of CAD stations communicatively connected to the manager and to each other.

In particular embodiments, while the manager is available, each one of the plurality of CAD stations transmits the critical data and the non-critical data originated at the CAD station to the manager and receives the critical data and the non-critical data originated at one or more other ones of the plurality of CAD stations from the manager; and while the manager is unavailable, each one of the plurality of CAD stations transmits the critical data originated at the CAD station directly to all other ones of the plurality of CAD stations and receives the critical data originated at the one or more other ones of the plurality of CAD stations directly from the one or more other ones of the plurality of CAD stations.

These and other features, aspects, and advantages of the disclosure are described in more detail below in the detailed description and in conjunction with the following figures.

DETAILED DESCRIPTION

Figure 1:
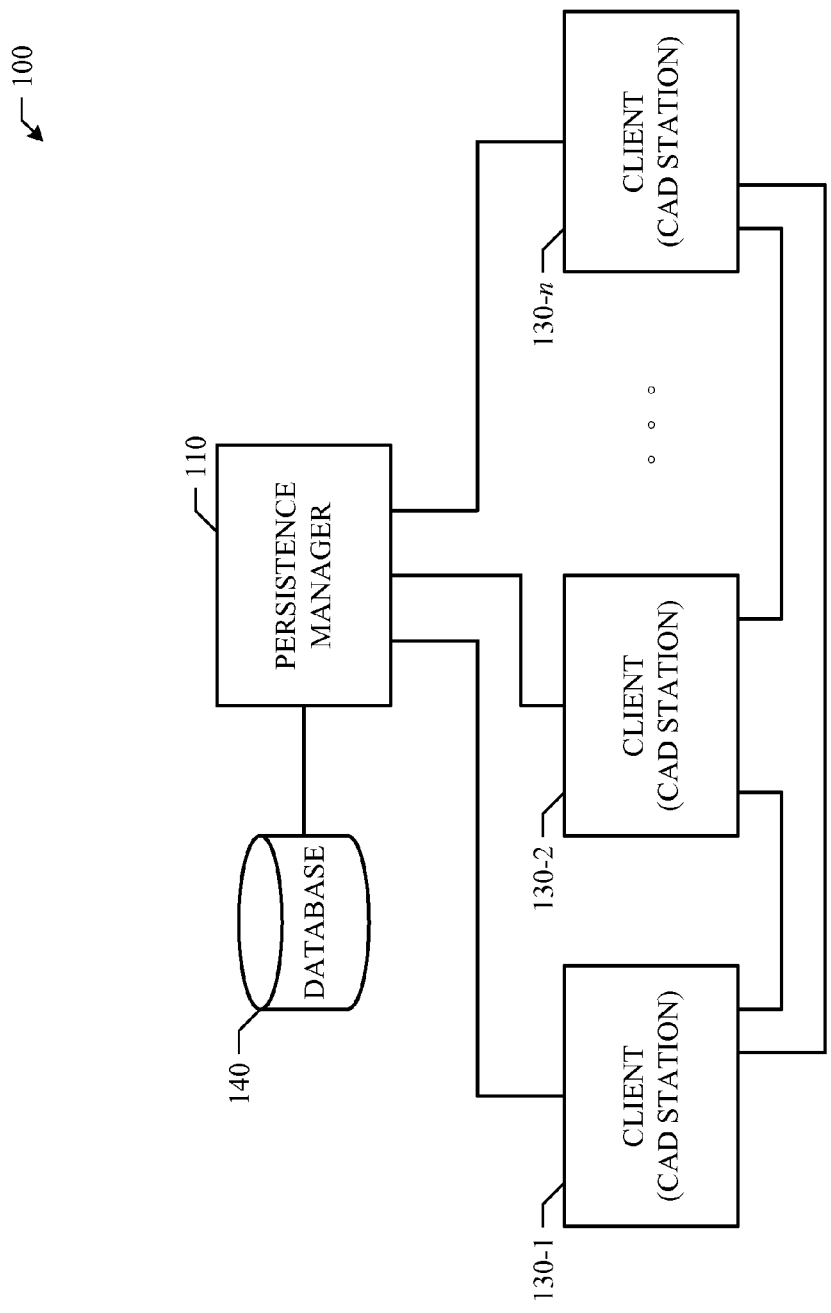
FIG. 1 illustrates a first example fail-safe mechanism for a CAD system.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A computer-aided or computer-assisted dispatch (CAD) system dispatches emergency or non-emergency services with the aid of computer systems. In particular embodiments, a CAD system may include one or more servers located in a central dispatch office, which may communicate with one or more clients including computer terminals in communications centers or mobile data terminals in the field. A CAD system may also include a suite of software programs executing on the servers and the clients that perform various appropriate functionalities, such as logging on/off time for the service personnel, generating and archiving incidents each of which may begin with a phone call for a service originated from a citizen or a service personnel in the field and end with providing the necessary service, generating incident numbers for incidents that require investigation, assigning field personnel, equipment, and other physical assets to incidents, updating incidents and logging those updates, time-stamping every action taken by a dispatcher at a terminal, and so on.

In an example scenario of a particular incident, the incident may begin with a 911 call originated from a citizen faced with a medical emergency. The 911 call may be routed to a communications center and answered by a call-taker (e.g., a 911 operator). The caller may describe the medical emergency to the 911 operator and the 911 operator may ask additional information from the caller (e.g., the current location of the patient). The 911 operator may input all the information from the 911 call in a CAD system. The CAD system may assign a incident number for this particular incident and put the incident in a database together with the other incidents waiting to be serviced. In particular embodiments, the incidents in the database may be serviced. A dispatcher, upon receiving the information about the 911 call, may check the current status of all the ambulances in the field and dispatch an available ambulance to the location of the patient. The medical personnel with the ambulance may provide medical services to the patient. Upon completing the necessary services (e.g., delivering the patient to a hospital), the medical personnel may report to the CAD system that services to the incident have been completed.

As the incident progresses from its beginning to its end, data may be generated from various sources. For example, the 911 operator may generate data based on the information received during the 911 call, such as the medical condition and the current location of the patient. The dispatcher may generate data when dispatching the ambulance to the location of the patient, such as which particular ambulance is dispatched and at what time and the names of the medical personnel with the dispatched ambulance. The medical personnel may generate data when performing the medical services to the patient, such as the patient's medical data, the medical procedures performed on the patient, and the hospital to which the patient is taken and the time the patient arrives at the hospital.

Of course, at any given time, there may be multiple incidents that are awaiting services and are being serviced. Similarly, at any given time, there may be multiple service units (e.g., ambulances, fire trucks, or police vehicles together with the service personnel) in the field, some of which are presently servicing particular incidents and thus are unavailable to respond to other incidents for the time being, and some of which are presently available and may be dispatched to service new incidents. As the incidents progress, data may be generated at the various entities (e.g., service equipments) involved with responding to and servicing each of the incidents. The data may be generated by an entity itself or may be input by human service personnel into the entity. In particular embodiments, the data generated during each incident may be collected and stored and become a part of the CAD system.

In particular embodiments, the data of a CAD system may be divided into two categories: critical data and non-critical data. In particular embodiments, the critical data may be data that are necessary in order to respond to and service the incidents at any given time. For example and without limitation, critical data may include which incidents are awaiting service, which incidents are currently being serviced, information concerning each incident, which service units are in the field, and which service units and personnel are presently available for dispatch. Personnel (e.g., dispatchers) of the CAD system may need such critical data in order to determine which service unit may be dispatched to which incident at a given time. In particular embodiments, the non-critical data, although important, may be data that are not absolutely necessary in order to respond to and service the incidents. The critical data may also be referred to as state data. For example and without limitation, critical data may include which service unit is dispatched to which incident; and non-critical data may include which service units may need maintenance and upgrade procedures, new service units that are to be added to the CAD system, or the work schedule of the service personnel. In particular embodiments, critical data may be generated in connection with each incident; and non-critical data may describe the system as a whole and provide a background for processing the critical data.

In particular embodiments, the data of a CAD system, including both critical data and non-critical data and regardless of from where the data have originated, may be stored in a centralized database so that they may be accessible to multiple entities in the CAD system and thus accessible to the service personnel using these entities. In particular embodiments, a manager, referred to as a "persistence manager", may mange access to the data stored in the database. In particular embodiments, the entities in the CAD system may be communicatively connected to the persistence manager. When new data are generated at an entity, the entity may transmit the data to the persistence manager. The persistence manager, upon receiving the data, may store the data in the database. Furthermore, the persistence manager may transmit the data to the other entities in the CAD system, thus distributing data originated at one entity to the other entities in the CAD system. Similarly, when an entity in the CAD system needs to retrieve data stored in the database, the entity may send a request to the persistence manager, and the persistence manager may retrieve the necessary data from the database and transmit the data to the entity.

One problem with accessing data stored in a centralized database via a persistence manager is that the data may become inaccessible when the persistence manager is unavailable due to various reasons (e.g., the database may be down or the data stored in the database may have been corrupted, or the persistence manager may be down due to hardware or software problems of the server hosting the persistence manager or due to communications or equipment problems of the network over which the persistence manager is connected with the clients). On the other hand, new data may be continuously generated at individual entities in connection with individual incidents while the persistence manager is unavailable. And yet, because the persistence manager is temporarily unavailable, the entities in the CAD system are unable to exchange data, especially critical data. Consequently, the dispatch services may be interrupted.

To provide a failover or fail-safe mechanism to a CAD system in case the persistence manager is temporarily unavailable, in particular embodiments, in addition to be communicatively connected with the persistence manager, the entities in the CAD system may be communicatively connected with each other. In particular embodiments, connections between the persistence manager and each of the entities and between each pair of entities may be any suitable network connections and may be direct or indirect connections. In particular embodiments, communications between the persistence manager and each of the entities and between each pair of entities may use any suitable communications protocol. For example, connections among the entities of the CAD system may be peer-to-peer connections.

In particular embodiments, each entity, when needing to access the database of the CAD system either for storing data or for retrieving data, may determine whether the persistence manager is available. If the persistence manager is available, the entity may access the database of the CAD system via the persistence manager. For example, the entity may transmit data that need to be stored in the database or retrieve data already stored in the database via the persistence manager. On the other hand, if the persistence manager is unavailable, the entities may exchange data with each other directly. In particular embodiments, a message-service component may be utilized for delivering the data among the entities of the CAD system. For example, when some new data are originated at a particular entity and need to be shared with the other entities, if the persistence manager is unavailable, the data-originating entity may transmit the data to the message-service component, which in turn delivers the data to the appropriate receiving entities. The message-service component may also temporarily store the data for the entities until the persistence manager is available again, after which time the stored data may be transmitted to the persistence manager to be stored in the database on a more permanent basis. Alternatively, in particular embodiments, when the persistence manager is unavailable, each entity may transmit data originated at that entity to the other entities in the CAD system via its peer-to-peer connections with the other entities. In particular embodiments, each entity in the CAD system may continuously monitor its peer-to-peer connections with the other entities in order to receive data originated at and transmitted by the other entities. In particular embodiments, while the persistence manager is unavailable, each entity may also temporarily store the data originated at that entity locally until the persistence manager is available again, after which time the stored data may be transmitted to the persistence manager to be stored in the database on a more permanent basis.

FIG. 1 illustrates a first example fail-safe mechanism for a CAD system 100. In particular embodiments, CAD system 100 may include a database 140 for storing various types of data of CAD system 100. Database 140 may include one or more storage units in which the data of CAD system 100 are stored. In particular embodiments, database 140 may be a relational database.

In particular embodiments, CAD system 100 may include a persistence manager 110 that is communicatively connected with database 140. In particular embodiments, persistence manager 110 may include hardware, software, or embedded logic components or a combination of two or more such components for carrying out the appropriate functionalities implemented or supported by persistence manager 110. For example and without limitation, persistence manager 110 may perform database access including data storage and retrieval, transaction management, data subscription, and other appropriate functionalities.

In particular embodiments, CAD system 100 may include one or more clients 130-1, 130-2, . . . , 130-n. Each client 130 is communicatively connected with persistence manager 110 and to the other clients 130. In particular embodiments, for each client 130, its connection with persistence manager 110 may be considered as its main communications channel, and its connections with the other clients 130 may be considered as its backup communications channels. In particular embodiments, each client 130 may include hardware, software, or embedded logic components or a combination of two or more such components for carrying out the appropriate functionalities implemented or supported by that client 130. For example, clients 130 may be CAD stations 130. A human user at each CAD station 130 may answer calls for service, create incidents in response to the calls for service, dispatch service units to respond to the incidents, input data generated from each incident into CAD system 110, and so on.

Communications among persistence manager 110 and clients 130 may use any suitable communications protocol. In particular embodiments, communications between persistence manager 110 and clients 130 may be based on Java Message Service (JMS). In this case, persistence manager 110 and clients 130 may each be considered as a JMS client. In particular embodiments, for each client 130, its backup communications channels with the other clients 130 may be peer-to-peer communications. In this case, each client 130 may continuously monitor the backup communications channels it has with the other clients 130 for data transmitted to that client 130 by the other clients 130 over the backup communications channels.

In particular embodiments, each client 130 (e.g., each CAD station 130) may maintain a local copy of the data (e.g., the critical data and the non-critical data) stored in database 140. In particular embodiments, the copy of the data maintained at each client 130 may be synchronized with the data stored in database 140 via persistence manager 110. For example, while persistence manager 110 is available, each client 130 may transmit to persistence manager 110 any updates (e.g., changes or additions) to the data that originated at that client 130 to persistence manager 110. Persistence manager 110, in turn, may update the data stored in database 140 as well as transmit the updates to the other clients 130. While persistence manager 110 is unavailable, in particular embodiments, clients 130 may exchange data or data updates via a publish-subscribe system. In a typical scenario, there may be a number of topics, and each client 130 may subscribe to one or more of these topics. If any client 130 has any new data that belong to a particular topic, the data may be transmitted to a message-service component (i.e., the client 130 publishes the data), which then delivers the data to all the clients 130 that have subscribed to that topic. Alternatively, each client 130 may transmit to the other clients 130 any updates to the data that originated at that client 130 via the peer-to-peer connections between clients 130. In addition, each client 130 may store the updates locally at that client 130. When persistence manager 110 is restored and available again, each client 130 may then transmit the stored updates to the data to persistence manager 110 so that persistence manager 110 may update the data stored in database 140.

In particular embodiments, when a particular client 130 (e.g., client 130-1) needs to access database 140, if persistence manager 110 is functioning correctly (i.e., available), client 130-1 may access database 140 via persistence manager 110 over its main communications channel. On the other hand, if persistence manager 110 is not available (e.g., temporarily down due to some type of malfunction), client 130-1 may directly exchange data with the other clients 130-2, . . . , 130-n over its backup communications channels. In addition, while persistence manager 110 is not available, each client 130 may temporarily store the data originated at that client 130 (e.g., data resulting from servicing an incident) locally for transmission to persistence manager 110 at a time in the future when persistence manager 110 is restored.

The backup communications channels between clients 130 provide a fail-safe mechanism in case persistence manager 110 is unavailable. In particular embodiments, while persistence manager 110 is unavailable, each client 130 may transmit at least the critical data originated at that client 130 to all the other clients 130 in CAD system 100 over its backup communications channels. As a result, each client 130 has all the current critical data of CAD system 110 regardless of from which client 130 the critical data have originated. The human user at each client 130 may continue to provide services based on the critical data received directly from the other clients 130, thus avoiding interrupting the service while persistence manager 110 is temporarily unavailable.

Figure 2:
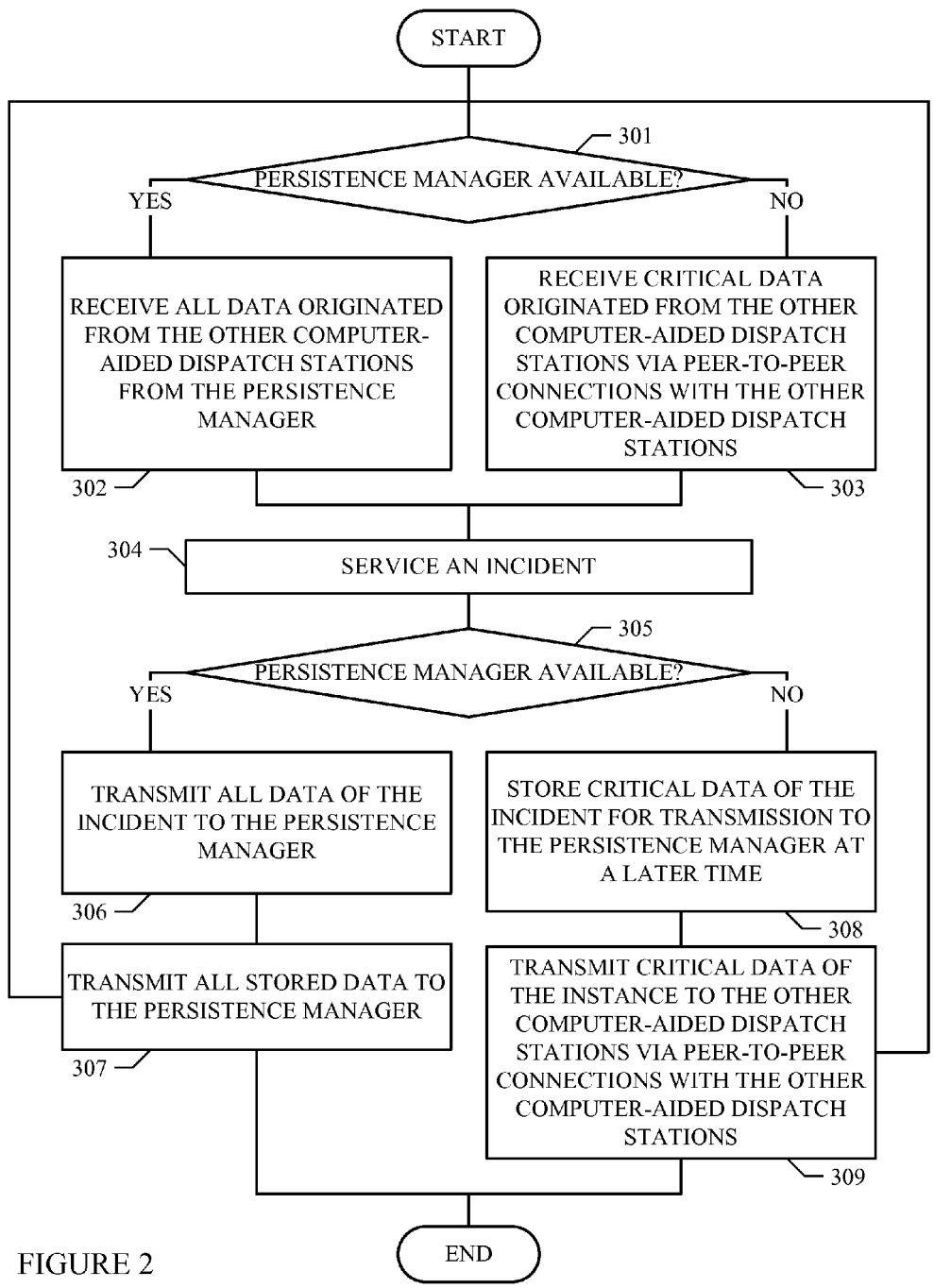
FIG. 2 illustrates an example method for providing fail-safe to a CAD system.
Figure 3:
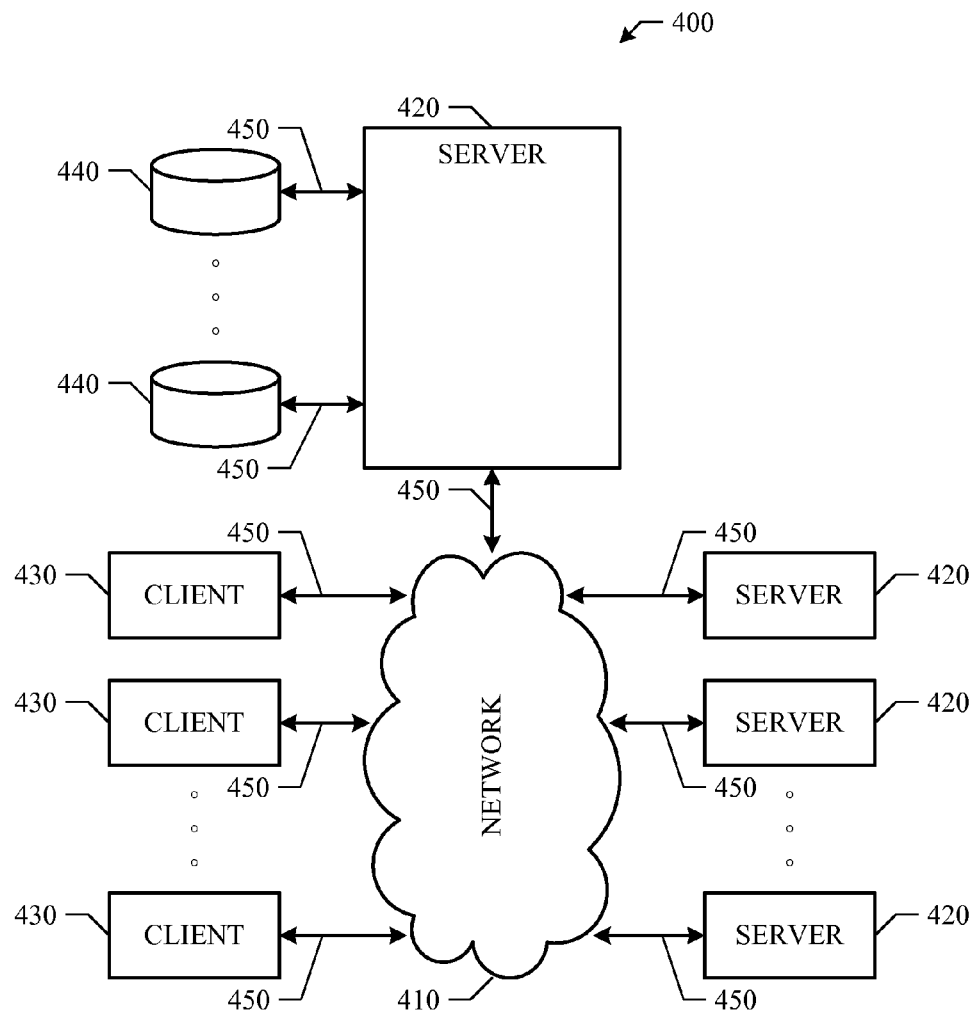
FIG. 3 illustrates an example network environment.

FIG. 2 illustrates an example method for providing a fail-safe mechanism to a CAD system. In particular embodiments, the CAD system includes a persistence manager and one or more clients (e.g., CAD stations). The steps in FIG. 3 are described from the point of view of a particular client (referred to as the first CAD station for clarification purposes) in the CAD system. In particular embodiments, when the first CAD station needs to access data stored in a database of the CAD system, the first CAD station may determine whether the persistence manager is available (step 301).

There may be various reasons causing a CAD station to access data stored in the database. For example, the CAD station may be ready to service another one of the incidents in the CAD system that are currently waiting to be serviced. As a result, the CAD station may need to know which is the next incident in the CAD system (e.g., the next incident in a database in which the indicants are stored) that needs to be serviced, the nature of that incident, what servicing units in the field are currently available, and so on. The CAD station may need to retrieve data originated at other CAD stations in the CAD system in order to have the current status of all the entities (e.g., incidents waiting to be serviced, servicing units in the field) in the CAD system in order to make informed decisions.

In particular embodiments, if the persistence manager is available (step 301, "YES"), then the first CAD station may receive the necessary data from the persistence manager (step 302). In particular embodiments, the first CAD station may receive both critical data and non-critical data originated at the other CAD stations (referred to as the second CAD stations for clarification purposes) in the CAD system from the persistence manager. Data may be pulled by the first CAD station from the persistence manager or pushed to the first CAD station by the persistence manager. In case of pulling the data, the first CAD station may request the data from the persistence manager when they are needed. The persistence manager may only transmit the data to the first CAD station upon receiving a data request. In case of pushing the data, the persistence manager may transmit the data to the first CAD station when the data become available and without waiting for specific requests from the first CAD station.

On the other hand, if the persistence manager is unavailable (step 301, "NO"), then the first CAD station may receive the necessary data directly from the second CAD stations in the CAD system (step 303). In particular embodiments, the first CAD station may receive critical data originated at the second CAD stations in the CAD system over peer-to-peer connections with these second CAD stations.

In particular embodiments, each CAD station in the CAD system may continually monitor (i.e., listen to) the peer-to-peer connections it has with the other CAD stations. If any data are transmitted over any of the peer-to-peer connections, each CAD station may receive the data and store the data locally.

In particular embodiments, while the persistence manager is unavailable, each CAD station may directly transmit the critical data originated at that CAD station to all other CAD stations with which that CAD station is communicatively connected with peer-to-peer connections. As a result, the CAD stations may each obtain current critical data originated at the other CAD stations despite the fact that the persistence manager is temporarily unavailable and use the current critical data to service the incidents.

In particular embodiments, the first CAD station may service an incident (e.g., the next incident in the database in which the incidents are stored) based at least on the critical data originated at the first CAD station and the critical data originated at the second CAD stations (step 304). For example, if the next incident to be serviced in the database is a medical emergency, the human user (e.g., a dispatcher) at the first CAD station may select an ambulance in the field that is presently available, transmit the information concerning the medical emergency to the medial personnel with the available ambulance, and dispatch the available ambulance to the location of the medical emergency.

In particular embodiments, various pieces of critical data may be generated at the first CAD station in connection with servicing the medical-emergency incident. In particular embodiments, each incident in the CAD system may be either an open incident or a closed incident. If an incident is open, it generally means that the incident has not been completely serviced and there may be more work that needs to be done in connection with the incident. If an incident is closed, it generally means that the servicing of the incident has been completed. In this sense, an incident may have a lifecycle that begins with the incident being created and assigned an incident number and ends with the incident being completely serviced and closed. Furthermore, each incident may have a current status indicating the current stage of the lifecycle the incident is at. For example, a status of "ready for dispatch" may indicate that the call-taker has received enough information concerning an incident so that a field-service unit may be dispatched to service the incident; a status of "en route" may indicate that the field-service unit is on its way to the location of the incident; and a status of "on scene" may indicate that the filed-service unit has arrived at the location of the incident. Information such as the current status of the incidents may be considered a part of the critical data. In the above example, if the first CAD station has dispatched an ambulance to respond to the medical emergency, then the status of the medical emergency needs to be updated from "ready for dispatch" to "en route" so that a second CAD station does not send another ambulance to service the same medical emergency again. Similarly, the ambulance that has been dispatched to respond to the medical emergency is no longer available while it is servicing this medical emergency. Therefore, the status of the ambulance may need to be updated so that the second CAD station does not attempt to dispatch the same ambulance to respond to another incident for the duration that the ambulance is responding to and handling the medical emergency.

In particular embodiments, the first CAD station may need to store the data generated in connection with servicing the incident in the database so that the data may be distributed to the second CAD stations for use when the second CAD stations service the other incidents. In particular embodiments, the first CAD station may determine whether the persistence manager is available (step 305).

In particular embodiments, if the persistence manager is available (step 305, "YES"), then the first CAD station may transmit all data, including critical data and non-critical data, generated in connection with servicing the incident to the persistence manager (step 306). In addition, in particular embodiments, there may be data stored at the first CAD station that have not been transmitted to the persistence manager. For example, while the first CAD station was servicing one or more previous incidents, the persistence manager may be unavailable. As a result, data generated in connection with servicing those previous incidents may not be transmitted to the persistence manager and may need to be stored at the first CAD station temporarily. Now that the persistence manager is available again, the first CAD station may transmit all of the stored data to the persistence manager (step 307). Alternatively, in particular embodiments, if a message-service component is used for delivering data on behalf of the CAD stations to the persistent manager, there may be data stored at the message-service component received from the first CAD station that have not been transmitted to the persistence manager because the persistence manager has been temporarily unavailable. Now that the persistence manager is available again, the message-service component may transmit all of the stored data to the persistence manager for a more permanent storage.

In particular embodiments, the persistence manager, upon receiving the data from the first CAD station, may store the data in the database and transmit (i.e., distribute) the data to the second CAD stations.

On the other hand, if the persistence manager is unavailable (step 305, "NO"), then the first CAD station may store the critical data generated in connection with servicing the incident locally or with a message-service component (step 308). The stored data may be transmitted to the persistence manager at a later time when the persistence manager is available again (step 307). In addition, the first CAD station may transmit the critical data generated in connection with servicing the incident to the second CAD stations via the peer-to-peer connection it has with these second CAD stations (step 309) or via a message-service component implementing a publish-subscribe system as described above.

In particular embodiments, each of the second CAD stations, upon receiving the critical data transmitted by the first CAD station, may store the critical data locally and use the data, together with other data it has, when servicing the incidents.

The persistence manager may become available or unavailable at any given time. Each CAD station may determine, from time to time (e.g., at steps 301 and 305) whether the persistence manager is currently available. If the persistence manager is available, each CAD station may exchange data updates with the database or with the other CAD stations via the persistence manager. If the persistence manager is unavailable, each CAD station may exchange data updates with the other CAD stations via the peer-to-peer connections among the CAD stations. In addition, each CAD station may temporarily store the data updates originated at that CAD station. At a later time, when the persistence manager is available again, each CAD station may then transmit the stored data updates to the persistence manager to be stored in the database.

Steps 301-309 may be repeated multiple times by each CAD station in a CAD system. Furthermore, although FIGS. 1-2 have been described in connection with CAD systems, the same concept may be applied similarly to other systems having similar architecture or infrastructure. For example, the exchange of data is not limited to CAD stations but may be extended to any type of components within a system that may need to exchange data among themselves.

Particular embodiments may be implemented in a network environment. FIG. 3 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a communications network, a satellite network, an IP-over-radio network, a portion of the Internet, or another network 410 or a combination of two or more such networks 410. The present disclosure contemplates any suitable network 410.

One or more links 450 couple servers 420 or clients 430 to network 410. In particular embodiments, one or more links 450 each includes one or more wired, wireless, or optical links 450. In particular embodiments, one or more links 450 each includes an intranet, an extranet, a VPN, a LAN, a WLAN, a WAN, a MAN, a communications network, a satellite network, an IP-over-radio network, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. A client 430 may enable a network user at client 430 to access network 410. A client 430 may have a web browser, such as Microsoft Internet Explorer or Mozilla Firefox, and may have one or more add-ons, plug-ins, or other extensions, such as Google Toolbar or Yahoo Toolbar. A client 430 may enable its user to communicate with other users at other clients 430. The present disclosure contemplates any suitable clients 430.

In particular embodiments, one or more data storages 440 may be communicatively connected with one or more servers 420 via one or more links 450. In particular embodiments, data storages 440 may be used to store various types of information. In particular embodiments, the information stored in data storages 440 may be organized according to specific data structures. Particular embodiments may provide interfaces that enable servers 420 or clients 430 to manage (e.g., retrieve, modify, add, or delete) the information stored in data storage 440.

In particular embodiments, a server 420 may host a persistence manager (e.g., the persistence manage implemented as computer software, which may be executed on a server 420). A client 430 may host a CAD station (e.g., the CAD station implemented as computer software, which may be executed on a client 430). In addition, multiple pieces of software may be executed on the same server 420 or client 430. Each client 430 may be communicatively connected with a server 420. Multiple clients 430 may be communicatively connected with each other via peer-to-peer connections or other types of connections.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be, for example and without limitation, procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
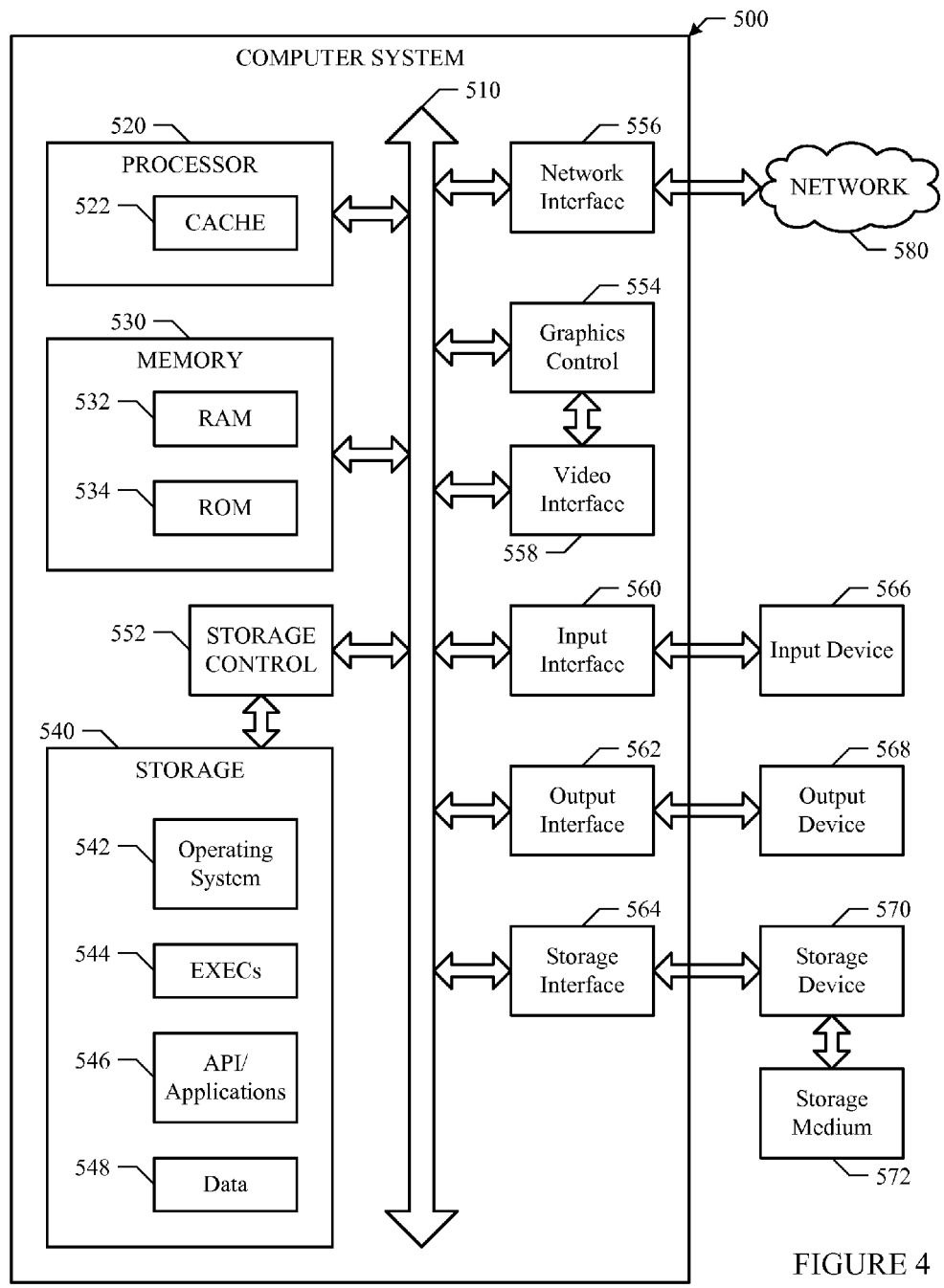
FIG. 4 illustrates an example computer system.

For example, FIG. 4 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 520 (or central processing units (CPUs)). A processor 520 may contain a cache 522 for temporary local storage of instructions, data, or computer addresses. Processors 520 are coupled to one or more storage devices, including memory 530. Memory 530 may include random access memory (RAM) 532 and read-only memory (ROM) 534. Data and instructions may transfer bi-directionally between processors 520 and RAM 532. Data and instructions may transfer unidirectionally to processors 520 from ROM 534. RAM 532 and ROM 534 may include any suitable computer-readable storage media.

Computer system 500 includes fixed storage 540 coupled bi-directionally to processors 520. Fixed storage 540 may be coupled to processors 520 via storage control unit 552. Fixed storage 540 may provide additional data storage capacity and may include any suitable computer-readable storage media. Fixed storage 540 may store an operating system (OS) 542, one or more executables 544, one or more applications or programs 546, data 548, and the like. Fixed storage 540 is typically a secondary storage medium (such as a hard disk) that is slower than primary storage. In appropriate cases, the information stored by fixed storage 540 may be incorporated as virtual memory into memory 530.

Processors 520 may be coupled to a variety of interfaces, such as, for example, graphics control 554, video interface 558, input interface 560, output interface 562, and storage interface 564, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 556 may couple processors 520 to another computer system or to network 580. With network interface 556, processors 520 may receive or send information from or to network 580 in the course of performing steps of particular embodiments. Particular embodiments may execute solely on processors 520. Particular embodiments may execute on processors 520 and on one or more remote processors operating together.

In a network environment, where computer system 500 is connected to network 580, computer system 500 may communicate with other devices connected to network 580. Computer system 500 may communicate with network 580 via network interface 556. For example, computer system 500 may receive information (such as a request or a response from another device) from network 580 in the form of one or more incoming packets at network interface 556 and memory 530 may store the incoming packets for subsequent processing. Computer system 500 may send information (such as a request or a response to another device) to network 580 in the form of one or more outgoing packets from network interface 556, which memory 530 may store prior to being sent. Processors 520 may access an incoming or outgoing packet in memory 530 to process it, according to particular needs.

Computer system 500 may have one or more input devices 566 (which may include a keypad, keyboard, mouse, stylus, etc.), one or more output devices 568 (which may include one or more displays, one or more speakers, one or more printers, etc.), one or more storage devices 570, and one or more storage medium 572. An input device 566 may be external or internal to computer system 500. An output device 568 may be external or internal to computer system 500. A storage device 570 may be external or internal to computer system 500. A storage medium 572 may be external or internal to computer system 500.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 530 may include one or more computer-readable storage media embodying software and computer system 500 may provide particular functionality described or illustrated herein as a result of processors 520 executing the software. Memory 530 may store and processors 520 may execute the software. Memory 530 may read the software from the computer-readable storage media in mass storage device 530 embodying the software or from one or more other sources via network interface 556. When executing the software, processors 520 may perform one or more steps of one or more processes described or illustrated herein, which may include defining one or more data structures for storage in memory 530 and modifying one or more of the data structures as directed by one or more portions the software, according to particular needs. In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A computer-aided dispatch (CAD) system, comprising:
    a database for storing critical data and non-critical data originated at a plurality of CAD stations;
    a manager that manages access to the critical data and the non-critical data stored in the database; and
    the plurality of CAD stations communicatively connected to the manager and to each other, wherein:
        while the manager is available, each one of the plurality of CAD stations transmits the critical data and the non-critical data originated at the CAD station to the manager and receives the critical data and the non-critical data originated at one or more other ones of the plurality of CAD stations from the manager; and
        while the manager is unavailable, each one of the plurality of CAD stations transmits the critical data originated at the CAD station directly to all other ones of the plurality of CAD stations and receives the critical data originated at the one or more other ones of the plurality of CAD stations directly from the one or more other ones of the plurality of CAD stations.

2. The CAD system of claim 1, further comprising a message-service component communicatively connected with the plurality of CAD stations, wherein the message-service component delivers the critical data originated at the plurality of CAD stations among the plurality of CAD stations using a publish-subscribe system while the manager is unavailable.

3. The CAD system of claim 1, wherein each one of the plurality of CAD stations is communicatively connected with other ones of the of CAD stations via peer-to-peer connections.

4. The CAD system of claim 3, wherein each one of the plurality of CAD stations continually monitors the peer-to-peer connections the CAD station has with the other ones of the plurality of CAD stations.

5. The CAD system of claim 1, wherein, while the manager is unavailable, each one of the plurality of CAD stations stores at the CAD station the critical data originated at the CAD station.

6. The CAD system of claim 5 wherein, when the manager is available again after being unavailable:
    each one of the plurality of CAD stations transmits the critical data stored at the CAD station to the manager; and
    the manager stores the critical data received from the plurality of CAD stations in the database.

7. The CAD system of claim 1, wherein each one of the plurality of CAD stations maintains a copy of at least a portion of the critical data or the non-critical data stored in the database and synchronizes its copy of the portion of the critical data or the non- critical data with the critical data and the non-critical data stored in the database via the manager.

8. A method, comprising:
- determining, at a first one of a plurality of computer-aided dispatch (CAD) stations, whether a manager to a database is available, wherein:
  - critical data and non-critical data originated at the plurality of CAD stations are stored in the database; and
  - the manager manages access to the critical data and the non-critical data stored in the database;
- if the manager is available, then:
  - transmitting, by the first one of the plurality of CAD stations, the critical data and the non-critical data originated at the first one of the plurality of CAD stations to the manager; and
  - receiving, by the first one of the plurality of CAD stations, the critical data and the non-critical data originated at one or more second ones of the plurality of CAD stations from the manager; and
- if the manager is unavailable, then:
  - transmitting, by the first one of the plurality of CAD stations, the critical data originated at the first one of the plurality of CAD stations directly to all second ones of the plurality of CAD stations; and
  - receiving, by the first one of the plurality of CAD stations, the critical data originated at the one or more second ones of the plurality of CAD stations directly from the one or more second ones of the plurality of CAD stations.

9. The method of claim 8, wherein the critical data originated at the plurality of CAD stations are exchanged among the plurality of CAD stations using a publish-subscribe system while the manager is unavailable.

10. The method of claim 8, wherein the first one of the plurality of CAD stations is communicatively connected with other ones of the plurality of CAD stations via peer-to-peer connections.

11. The method of claim 10, further comprising continually monitoring, by the first one of the plurality of CAD stations, the peer-to-peer connections the first one of the plurality of CAD stations has with the other ones of the plurality of CAD stations.

12. The method of claim 8, further comprising, if the manager is unavailable, then storing, at the first one of the plurality of CAD stations, the critical data originated at the first one of the plurality of CAD stations.

13. The method of claim 12, further comprising, if the manager is available again after being unavailable, then transmitting, by the first one of the plurality of CAD stations, the critical data stored at the first one of the plurality of CAD stations to the manager.

14. The method of claim 8, further comprising:
- maintaining, by the first one of the plurality of CAD stations, a copy of the critical data and the on-critical data stored in the database at the first one of the plurality of CAD stations; and
- synchronizing, by the first one of the plurality of CAD stations, its copy of the critical data and the on-critical data with the critical data and the on-critical data stored in the database via the manager.

15. One or more non-transitory computer-readable tangible storage media embodying software operable when executed by one or more computer systems to:
- determine, at a first one of a plurality of computer-aided dispatch (CAD) stations, whether a manager to a database is available, wherein:
  - critical data and non-critical data originated at the plurality of CAD stations are stored in the database; and
  - the manager manages access to the critical data and the non-critical data stored in the database;
- if the manager is available, then:
  - transmit, by the first one of the plurality of CAD stations, the critical data and the non-critical data originated at the first one of the plurality of CAD stations to the manager; and
  - receive, by the first one of the plurality of CAD stations, the critical data and the non-critical data originated at one or more second ones of the plurality of CAD stations from the manager; and
- if the manager is unavailable, then:
  - transmit, by the first one of the plurality of CAD stations, the critical data originated at the first one of the plurality of CAD stations directly to all second ones of the plurality of CAD stations; and
  - receive, by the first one of the plurality of CAD stations, the critical data originated at the one or more second ones of the plurality of CAD stations directly from the one or more second ones of the plurality of CAD stations.

16. The non-transitory media of claim 15, wherein the critical data originated at the plurality of CAD stations are exchanged among the plurality of CAD stations using a publish-subscribe system while the manager is unavailable.

17. The non-transitory media of claim 15, wherein the first one of the plurality of CAD stations is communicatively connected with other ones of the plurality of CAD stations via peer-to-peer connections.

18. The non-transitory media of claim 17, wherein the software is further operable when executed by one or more computer systems to continually monitor, by the first one of the plurality of CAD stations, the peer-to-peer connections the first one of the plurality of CAD stations has with the other ones of the plurality of CAD stations.

19. The non-transitory media of claim 15, wherein the software is further operable when executed by one or more computer systems to, if the manager is unavailable, then store, at the first one of the plurality of CAD stations, the critical data originated at the first one of the plurality of CAD stations.

20. The non-transitory media of claim 19, wherein the software is further operable when executed by one or more computer systems to; if the manager is available again after being unavailable, then transmit, by the first one of the plurality of CAD stations, the critical data stored at the first one of the plurality of CAD stations to the manager.

21. The non-transitory media of claim 15, wherein the software is further operable when executed by one or more computer systems to:
- maintain, by the first one of the plurality of CAD stations, a copy of at least a portion of the critical data or the non-critical data stored in the database at the first one of the plurality of CAD stations; and
- synchronize, by the first one of the plurality of CAD stations, its copy of the portion of the critical data or the non-critical data with the critical data and the on-critical data stored in the database via the manager.

* * * * *